(12) United States Patent
Humber et al.

(10) Patent No.: US 7,077,156 B1
(45) Date of Patent: Jul. 18, 2006

(54) ICE MAKER VALVE BOX

(75) Inventors: Jeffrey A. Humber, Memphis, TN (US); Steven R. Cole, Collierville, TN (US)

(73) Assignee: IPS Corporation, Collierville, TN (US)

( * ) Notice: Subject to any disclaimer, the term of this patent is extended or adjusted under 35 U.S.C. 154(b) by 0 days.

(21) Appl. No.: 11/188,990

(22) Filed: Jul. 25, 2005

(51) Int. Cl.
*F16L 5/00* (2006.01)
(52) U.S. Cl. ........................ 137/360; 312/229
(58) Field of Classification Search .......... 137/360; 312/229, 242
See application file for complete search history.

(56) References Cited

U.S. PATENT DOCUMENTS

| | | | | |
|---|---|---|---|---|
| 3,834,781 A | * | 9/1974 | Logsdon | 312/229 |
| 4,410,004 A | * | 10/1983 | Kifer et al. | 137/360 |
| 4,637,422 A | * | 1/1987 | Izzi, Sr. | 137/360 |
| 6,129,109 A | * | 10/2000 | Humber | 137/360 |

* cited by examiner

*Primary Examiner*—A. Michael Chambers
(74) *Attorney, Agent, or Firm*—Gauthier & Connors, LLP

(57) ABSTRACT

In one aspect of the present invention, an ice maker valve box has a housing having a cylindrical side wall leading from a front edge bordering a circular front opening to rounded circular shoulder joined to a flat back wall. The front edge and back wall are arranged in parallel front and rear planes. A pair of first mounting tabs projects laterally and horizontally from the side wall in a first intermediate plane located between and parallel to the front and rear planes. The first mounting tabs have apertures therein for receiving first fasteners. Ledges extend rearwardly from the first mounting tabs to the rear plane. A pair of second mounting tabs joins the first mounting tabs and projects laterally and vertically from said side wall in other intermediate planes parallel to said front, first intermediate, and rear planes. The second mounting tabs define passages for receiving second fasteners. A circular cover is detachably mounted on the housing at the front opening, the cover having a cylindrical skirt received in the side wall and an annular rim projecting radially from the front ledge.

2 Claims, 5 Drawing Sheets

ICE MAKER VALVE BOX

BACKGROUND OF THE INVENTION

1. Field of the Invention

This invention relates to a valve box for ice makers and other like appliances.

2. Description of the Prior Art

Water is supplied to ice makers and the like by conduits that include shut-off valves. The shut-off valves are typically housed in valve boxes adapted to be secured to wall structures at exposed and readily accessible locations.

However, experience has indicated that the prior art valve boxes are disadvantageously limited in their adaptability to being readily and securely attached to the different stud configurations of various wall structures.

SUMMARY OF THE INVENTION

An object of the present invention is to provide a valve box for a valve connection that overcomes the limitations and shortcomings of the prior art by providing a space-saving functional housing enclosure having alignment and mounting features that permit the structure to be aligned and secured to building wall supports in a variety of ways.

In one aspect of the present invention, an ice maker valve box has a housing having a cylindrical side wall leading from a front edge bordering a circular front opening to a rounded circular shoulder joined to a flat back wall. The front edge and back wall are arranged in parallel front and rear planes. First mounting tabs project laterally and horizontally from the side wall in a first intermediate plane located between and parallel to the front and rear planes. The first mounting tabs have apertures therein for receiving first fasteners. Ledges extend rearwardly from the first mounting tabs to the rear plane. Second mounting tabs join the ledges and project laterally and vertically from said side wall. The second mounting tabs define passages for receiving second fasteners. A circular cover is detachably mounted on the housing at the front opening. The cover has a cylindrical skirt received in the side wall and an annular rim projecting radially from the front ledge.

An advantage of the present invention is that the ice maker valve box can be positioned and mounted to a range of stud configurations because the mounting tabs accommodate different positions and orientations for accepting the fasteners.

These and other features and advantages of the present invention will now be described in greater detail with reference to the accompanying drawings.

DETAILED DESCRIPTION

Figure 1:
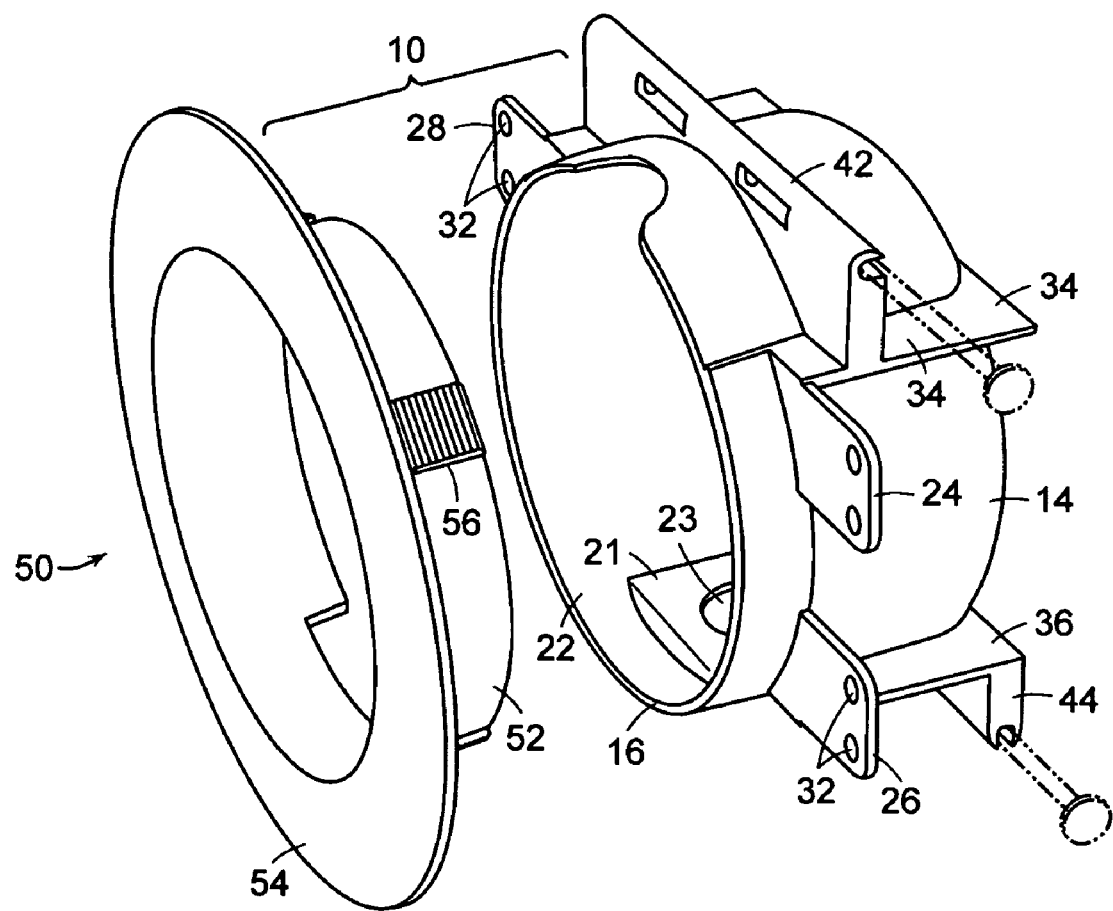
FIG. 1 is an exploded isometric front view of an ice maker valve box according to the present invention.
Figure 2:
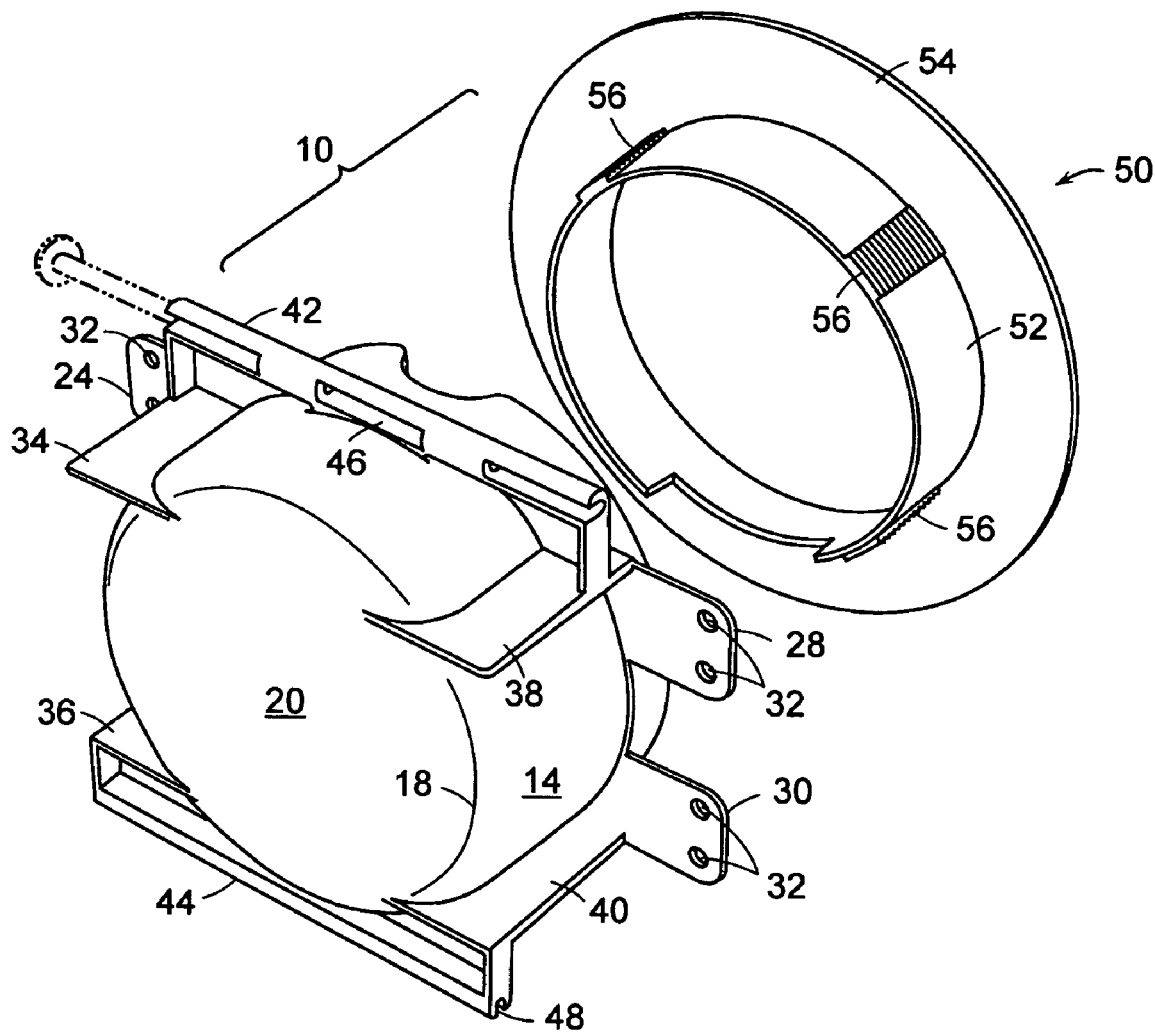
FIG. 2 is an exploded isometric rear view of the ice maker valve box.
Figure 3:
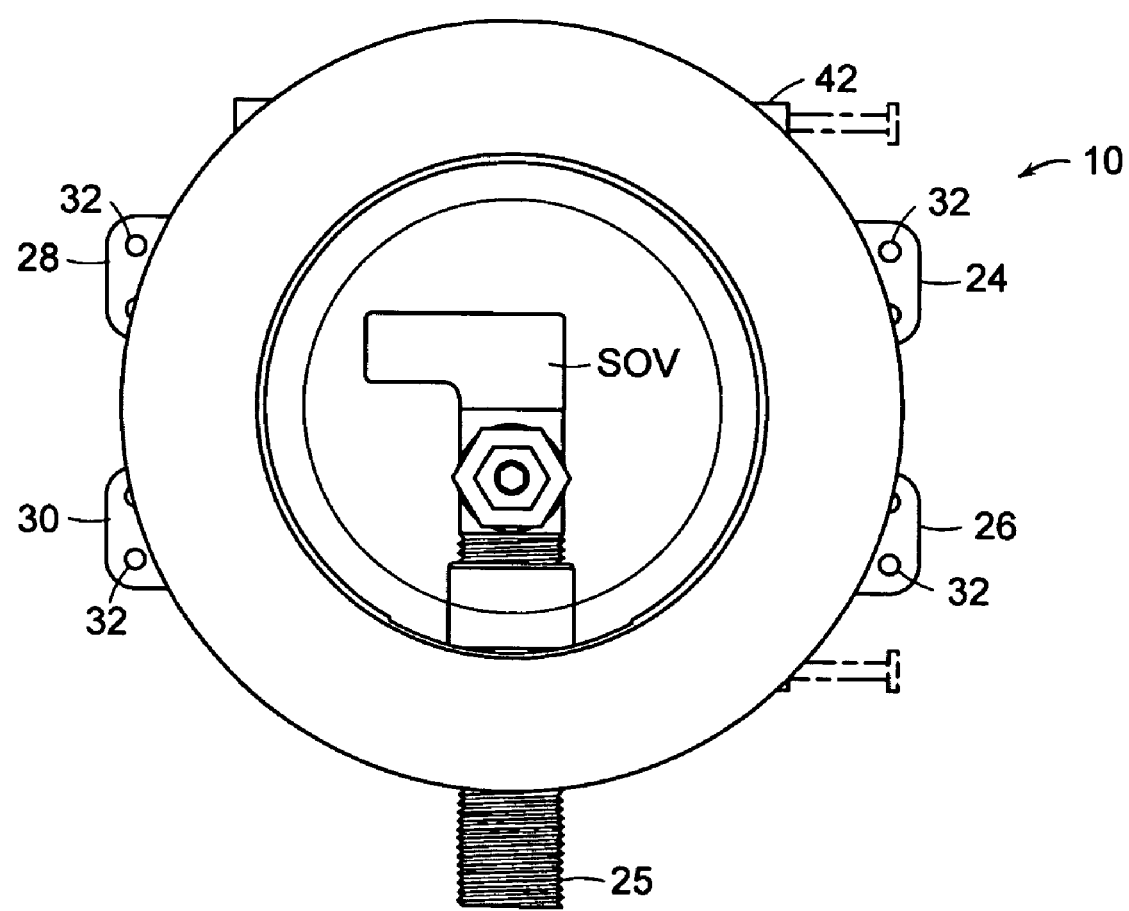
FIG. 3 is a front view of the ice maker valve box enclosing a shut-off valve.
Figure 4:
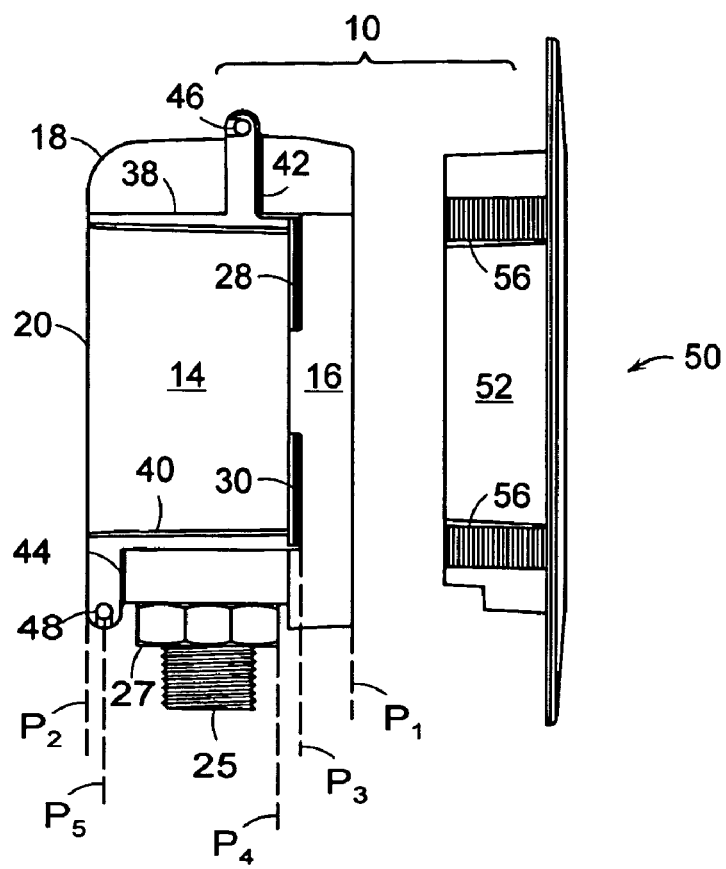
FIG. 4 is an exploded side view of the ice maker valve box enclosing a shut-off valve.
Figure 5:
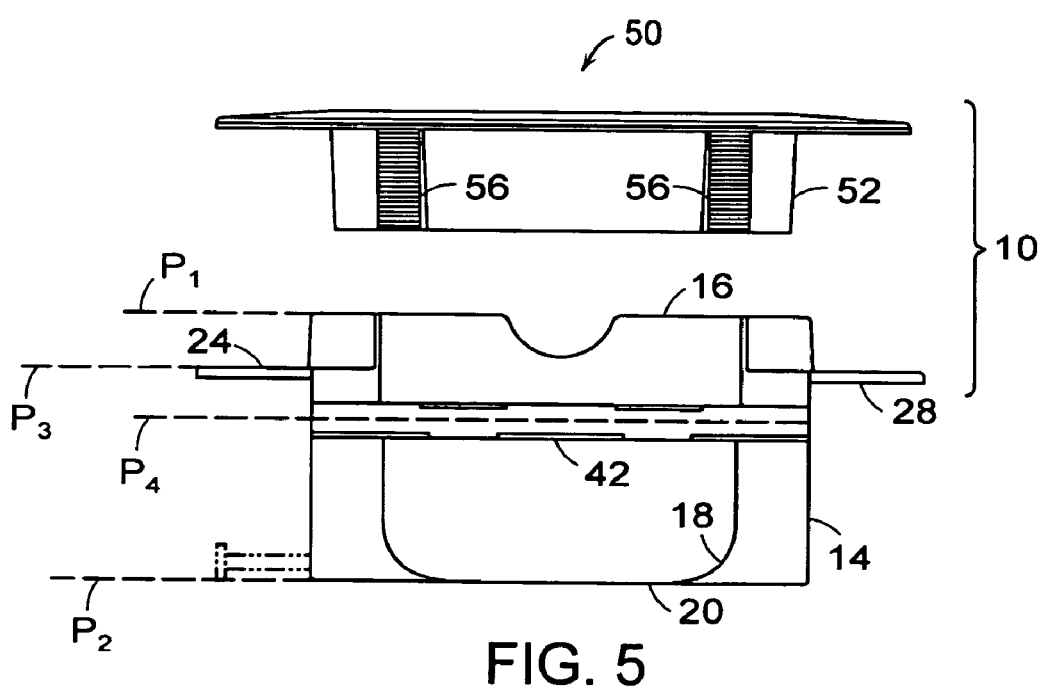
FIG. 5 is an exploded top view of the ice maker valve box.
Figure 6:
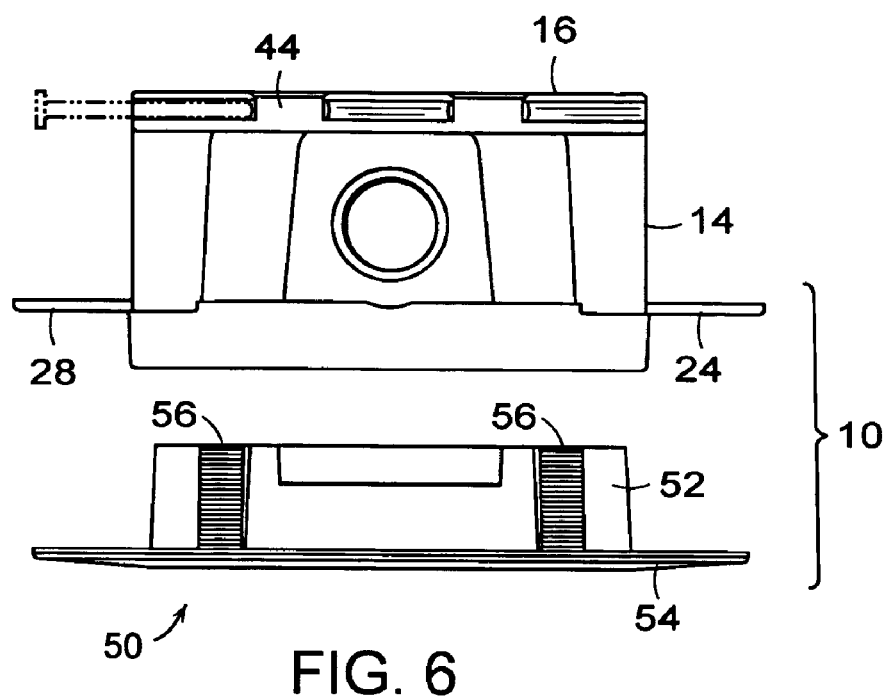
FIG. 6 is an exploded bottom view of the ice maker valve box.
Figure 7:
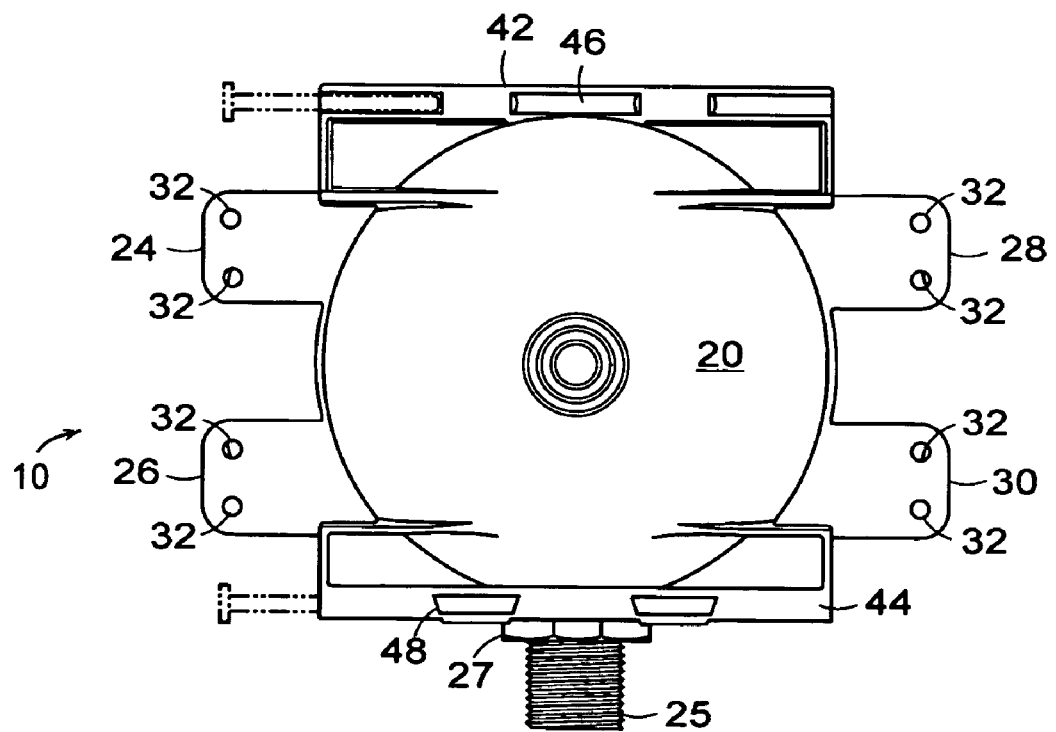
FIG. 7 is a rear view of the ice maker valve box housing enclosing a shut-off valve.

With reference to the drawings, an ice maker valve box 10 of the present invention has a generally cup-shaped housing with a cylindrical side wall 14 leading from front edge 16, disposed in a front plane $P_1$, to a rounded circular shoulder 18. Housing 12 has a flat back wall 20 disposed in a rear plane $P_2$ and enclosing the back side of housing to form a valve cavity 22. Preferably, side wall 14 includes a substantially flat base portion 21 with an opening 23 sized to accommodate the threaded stem 25 of a shut-off valve SOV. A nut 27 coacts with the threaded stem 25 to hold the valve SOV in place on the flat base portion 21.

Mounting tabs 24, 26, 28, and 30 project laterally and horizontally from side wall 14. In one example, tabs 24 and 26 are paired on one side of the housing and tabs 28 and 30 are paired on the opposite side of the housing. Tabs 24, 26, 28, and 30 are disposed in a first intermediate plane $P_3$ parallel to the front and rear planes $P_1$ and $P_2$ and define openings 32 for receiving fasteners (not shown) such as nails or screws in a direction transverse to planes $P_1$–$P_3$. Thus, valve box 10 could be mounted to surfaces parallel to plane $P_3$ between two studs spaced to accommodate the width of housing 12.

Ledges 34, 36, 38, and 40 project laterally from and extend rearwardly along side wall 14 from tabs 24, 26, 28, and 30, respectively, to back wall 20. Ledges 34, 36, 38, and 40 may be used to orient opening 23 relative to the wall studs to which the valve box is to be secured.

Mounting tab 42 joins ledges 34 and 38 and is located in a plane $P_4$ between and parallel to planes $P_2$ and $P_3$. Mounting tab 44 joins ledges 36 and 40 and is located in a plane $P_5$ spaced slightly forwardly from the rear plane $P_2$. Elongated sleeves 46 and 48 are formed at the edges of tabs 42 and 44, respectively. The sleeves 46 and 48 are tangent to the cylindrical side wall 14 and are sized to accommodate fasteners, such as nails (shown in broken line), in a direction substantially parallel their respective planes $P_4$ and $P_5$. By using mounting tabs 42 and 44, valve box 10 can be mounted to either side of a stud.

A cover 50 is detachably mounted to the front side of housing. Cover 50 has a cylindrical skirt 52 sized to be received within valve cavity 22 and an annular rim 54 projecting radially from the skirt 52. Teeth 56 are disposed on the outer surface of skirt 52 for gripping the interior surface of housing wall 14 and holding skirt 52 within valve cavity 22. By having teeth 56 along the length of skirt 52, cover 50 can be axially adjusted within the housing to bring rim 54 flush with the surrounding building structure (e.g., wallboard or plaster) having a range of thicknesses. Both the housing and cover 50 may be formed from injection-molded plastic such as polystyrene or polyethylene.

The foregoing description has been limited to a specific embodiment of the invention. It will be apparent, however, that variations and modifications can be made to the invention, with the attainment of some or all of the advantages of the invention. Therefore, it is the object of the appended claims to cover all such variations and modifications as come within the true spirit and scope of the invention.

The invention claimed is:

1. A valve box comprising:
   a housing having a cylindrical side wall leading from a front edge bordering a circular front opening to rounded circular shoulder joined to a flat back wall, said front edge and back wall being arranged in parallel front and rear planes;

first mounting tabs projecting laterally and horizontally from said side wall in a first intermediate plane located between and parallel to said front and rear planes, said first mounting tabs having apertures therein for receiving first fasteners;

ledges extending rearwardly from said first mounting tabs to said rear plane;

second mounting tabs joining said ledges and projecting laterally and vertically from said side wall, said second mounting tabs defining sleeves for receiving second fasteners; and a circular cover detachably mounted on said housing at said front opening, said cover having a cylindrical skirt received in said side wall and an annular rim projecting radially from said front ledge.

2. The valve box of claim 1 wherein the sleeve of one of said second tabs is tangent to said side wall at a location spaced rearwardly from said first intermediate plane, and wherein the passage of the other of said second mounting tabs is tangent to said rounded circular shoulder at a location spaced forwardly of said rear plane.

* * * * *